(12) United States Patent
Shahim et al.

(10) Patent No.: US 12,210,902 B2
(45) Date of Patent: Jan. 28, 2025

(54) SYSTEM AND METHOD FOR MAINTAINING DEPENDENCIES IN A PARALLEL PROCESS

(71) Applicant: Deep Vision Inc., Los Altos, CA (US)

(72) Inventors: Mohamed Shahim, Thrissur (IN); Sreenivas Aerra Reddy, Hyderabad (IN); Raju Datla, Hyderabad (IN); Lava Kumar Bokam, Vizianagaram (IN); Suresh Kumar Vennam, Hyderabad (IN); Sameek Banerjee, Hyderabad (IN)

(73) Assignee: Deep Vision Inc., Los Altos, CA (US)

( * ) Notice: Subject to any disclaimer, the term of this patent is extended or adjusted under 35 U.S.C. 154(b) by 0 days.

(21) Appl. No.: 18/442,603

(22) Filed: Feb. 15, 2024

(65) Prior Publication Data

US 2024/0272939 A1    Aug. 15, 2024

Related U.S. Application Data

(63) Continuation of application No. 17/973,290, filed on Oct. 25, 2022, now Pat. No. 11,941,440, which is a continuation of application No. 17/211,707, filed on Mar. 24, 2021, now Pat. No. 11,513,847.

(60) Provisional application No. 62/994,108, filed on Mar. 24, 2020.

(51) Int. Cl.
| | | |
|---|---|---|
| G06F 9/46 | (2006.01) | |
| G06F 9/48 | (2006.01) | |
| G06F 9/52 | (2006.01) | |
| G06N 3/063 | (2023.01) | |

(52) U.S. Cl.
CPC ............ *G06F 9/4881* (2013.01); *G06F 9/485* (2013.01); *G06F 9/52* (2013.01); *G06N 3/063* (2013.01)

(58) Field of Classification Search
CPC ........... G06F 9/4881; G06F 9/485; G06F 9/52
See application file for complete search history.

*Primary Examiner* — Gregory A Kessler
(74) *Attorney, Agent, or Firm* — Run8 Patent Group, LLC; Peter Miller; Brian T. Chew

(57) ABSTRACT

A method includes: dequeuing a signal primitive from a signaling command queue in the set of command queues, the signal primitive pointing to a waiting command queue; in response to the signal primitive pointing to the waiting command queue, incrementing a number of pending signal primitives in the signal-wait counter matrix; dequeuing a wait primitive from the waiting command queue, the wait primitive pointing to the signaling command queue; in response to the wait primitive pointing to the signaling command queue, accessing the register to read the number of pending signal primitives; in response to the number of pending signal primitives indicating at least one pending signal primitive: decrementing the number of pending signal primitives; and dequeuing an instruction from the waiting command queue; and dispatching a control signal representing the instruction to a resource.

8 Claims, 4 Drawing Sheets

SYSTEM AND METHOD FOR MAINTAINING DEPENDENCIES IN A PARALLEL PROCESS

CROSS-REFERENCE TO RELATED APPLICATIONS

This Application is a continuation of U.S. patent application Ser. No. 17/973,290, filed on 25 Oct. 2022, which is a continuation of U.S. patent application Ser. No. 17/211,707, filed on 24 Mar. 2021, which claims the benefit of U.S. Provisional Application No. 62/994,108, filed on 24 Mar. 2020, each of which is incorporated in its entirety by this reference.

This Application is related to U.S. patent application Ser. No. 17/127,904, filed on 18 Dec. 2020, and U.S. Pat. No. 10,474,464, filed on 3 Jul. 2018, each of which is incorporated in its entirety by this reference.

TECHNICAL FIELD

This invention relates generally to the field of parallel processing and more specifically to a new and useful system and method for maintaining dependencies in a parallel process in the field of parallel processing.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
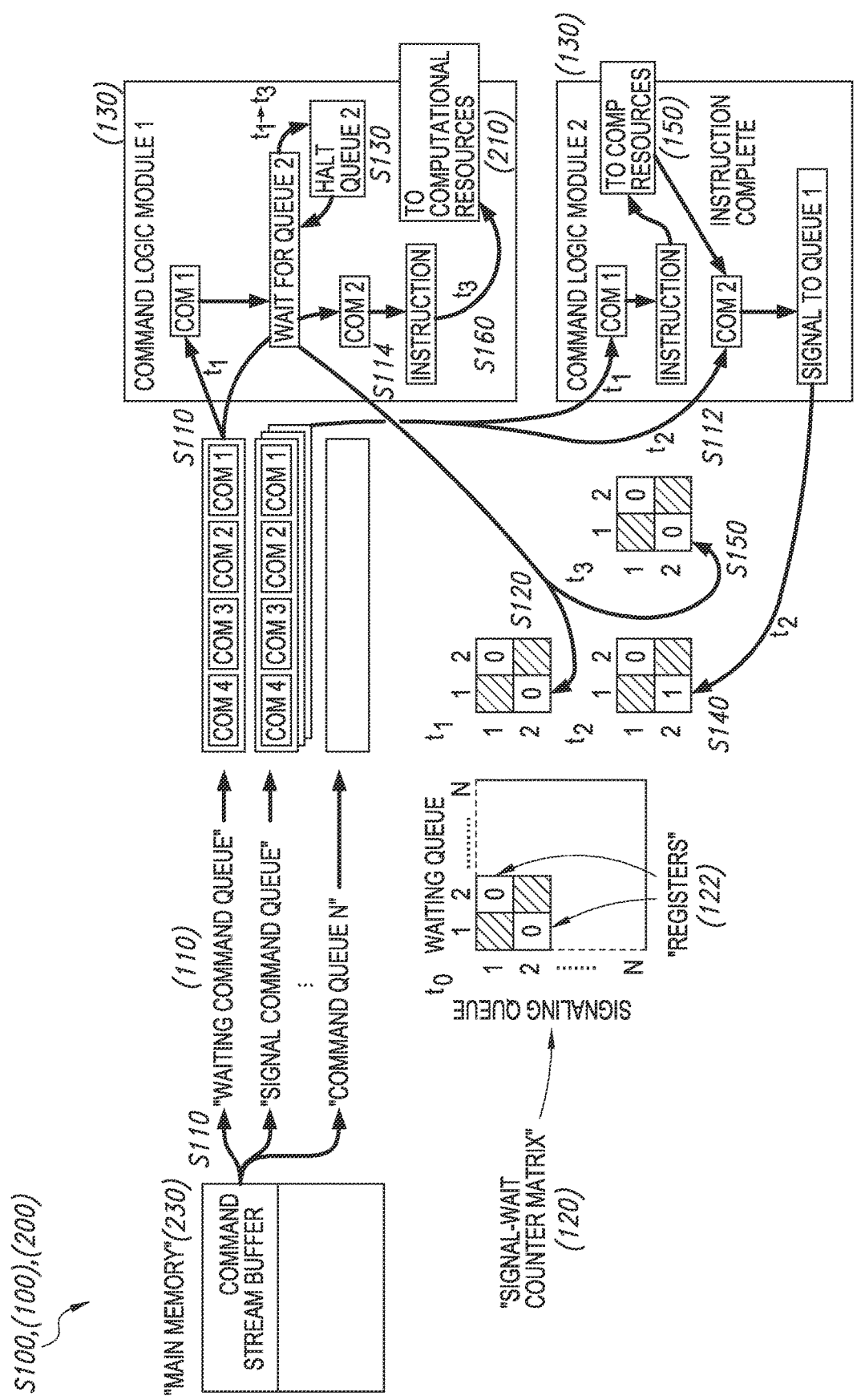
FIG. 1A is a flowchart representation of a method.

As shown in FIG. 1A, a method S100 for maintaining dependencies between command streams for a multicore processor includes, at a queue processor including a set of command queues and a signal-wait counter matrix: dequeuing a first wait primitive from a first waiting command queue in the set of command queues, the first wait primitive pointing to a first signaling command queue in the set of command queues in Block S110; in response to the first wait primitive pointing to the first signaling command queue, accessing a first register of the signal-wait counter matrix, the first register storing a first number of pending signal primitives for the first waiting command queue dequeued from the first signaling command queue in Block S120; in response to the first number of pending signal primitives indicating an absence of pending signal primitives, halting the first waiting command queue in Block S130; dequeuing a first signal primitive from the first signaling command queue, the first signal primitive pointing to the first waiting command queue in Block S112; and, in response to the first signal primitive pointing to the first waiting command queue, incrementing the first number of pending signal primitives in the first register in Block S140. The method S100 also includes, in response to the first number of pending signal primitives representing at least one pending signal primitive: decrementing the first number of pending signal primitives in the first register in Block S150; and dequeuing a first instruction from the first waiting command queue, the first instruction subsequent to the first wait primitive and assigned to a first resource of the multicore processor in Block S114; and, in response to dequeuing the first instruction from the first waiting command queue, dispatching a first control signal to the first resource representing the first instruction in Block S160.

Figure 1B:
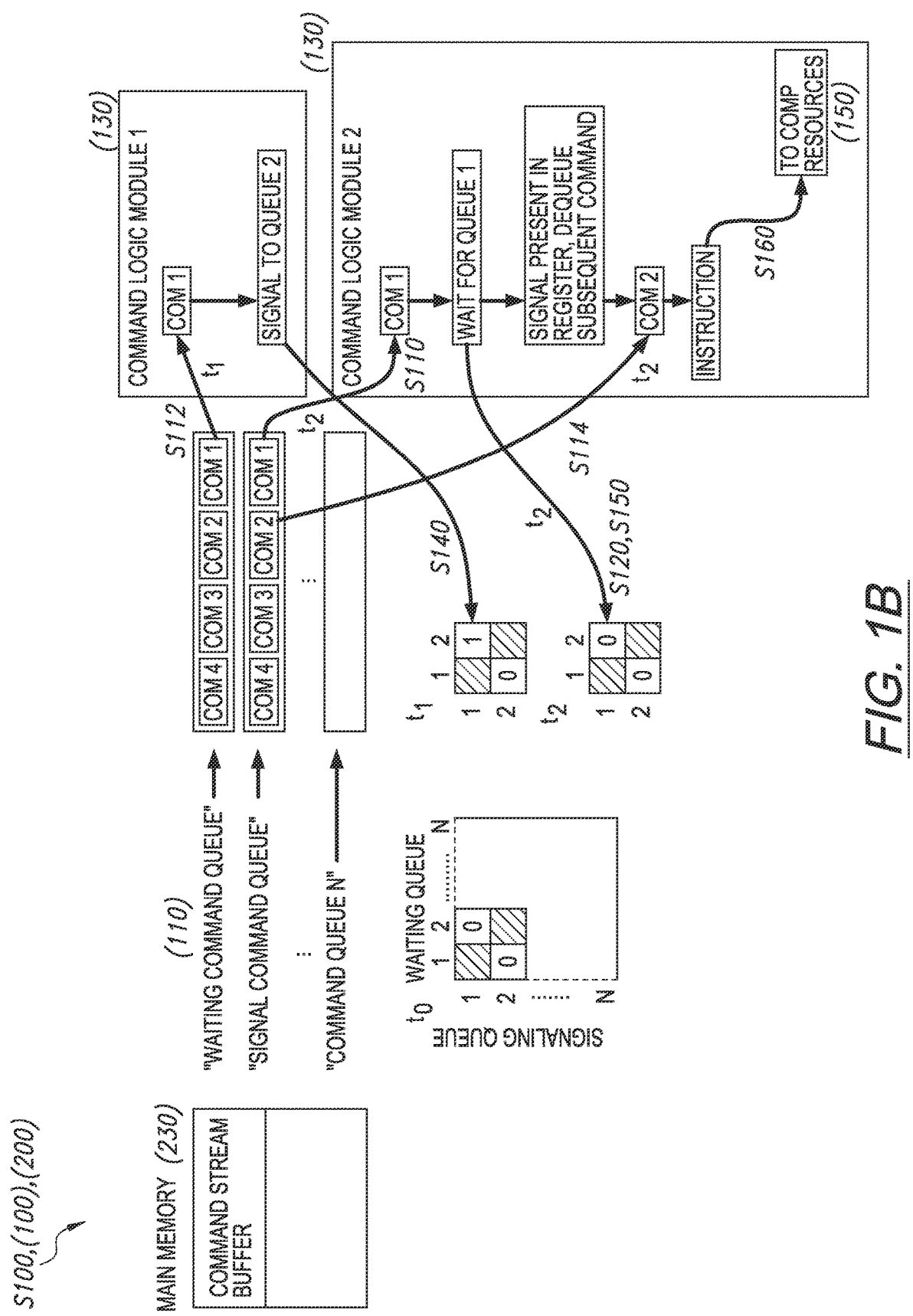
FIG. 1B is a flowchart representation of one variation of the method

As shown in FIG. 1B, one variation of the method S100 includes: dequeuing a first signal primitive from a first signaling command queue in the set of command queues, the first signal primitive pointing to a first waiting command queue in the set of command queues in Block S112; in response to the first signal primitive pointing to the first waiting command queue, incrementing a first number of pending signal primitives stored by a first register of the signal-wait counter matrix, the first register corresponding to the first signaling command queue and the first waiting command queue in Block S140; dequeuing a first wait primitive from the first waiting command queue, the first wait primitive pointing to the first signaling command queue in Block S110; and, in response to the first wait primitive pointing to the first signaling command queue, accessing the first register to read the first number of pending signal primitives in Block S120. This variation of the method S100 also includes, in response to the first number of pending signal primitives indicating at least one pending signal primitive: decrementing the first number of pending signal primitives in the first register in Block S150; dequeuing a first instruction from the first waiting command queue, the first instruction subsequent to the first wait primitive and assigned to a first resource of the multicore processor in Block S114; and in response to dequeuing the first instruction from the first waiting command queue, dispatching a first control signal to the first resource representing the first instruction in Block S160.

2. Queue Processor

Figure 2:
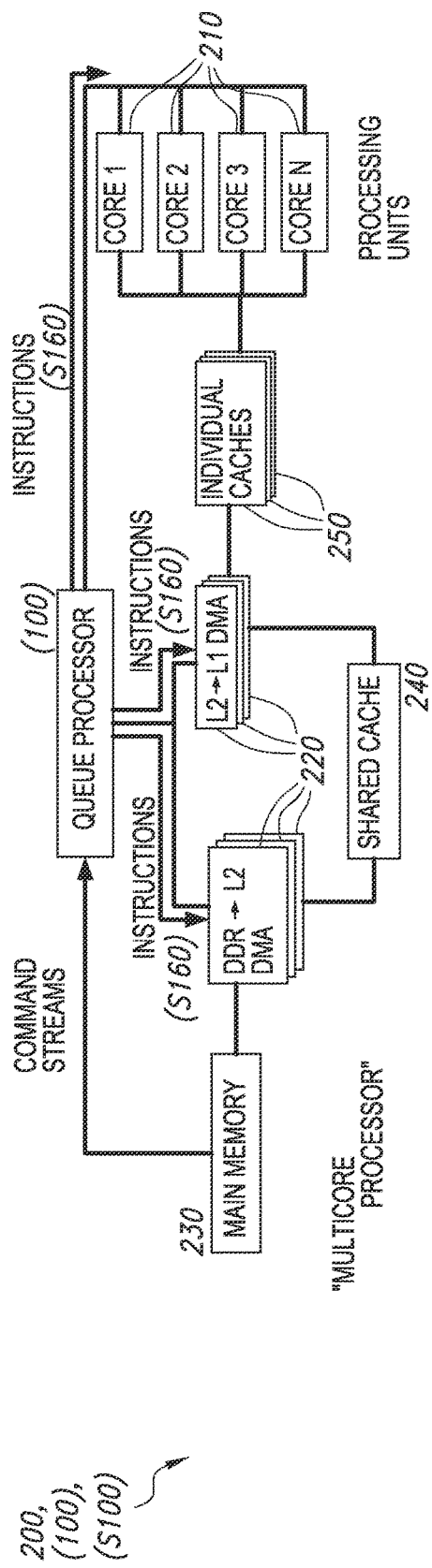
FIG. 2 is a schematic representation of a queue processor.

As shown in FIG. 2, a queue processor 100 for maintaining dependencies between command streams for a multicore processor 200 includes: a set of command queues 110, a signal-wait counter matrix 120, a set of command logic modules 130, a set of reorder buffers 140, and a control bus 150. The set of command queues 110 is communicatively coupled to a memory component 102, wherein each command queue 110 in the set of command queues 110 is configured to store a command stream in a set of command streams. The signal-wait counter matrix 120, includes a set of registers 122, each register 122 in the set of registers 122: corresponding to a waiting command queue 112 in the set of command queues 110 and a signaling command queue 114 in the set of command queues 110; and storing a number of pending signal primitives for the waiting command queue 112 dequeued from the signaling command queue 114. Each command logic module 130 in the set of command logic modules 130 is: communicatively coupled to a command queue 110 in the set of command queues 110; communicatively coupled to the signal-wait counter matrix 122; and configured to interpret commands from the command queue 110, the commands including signal primitives, wait primitives; and instructions. Each reorder buffer 140 in the set of reorder buffers is communicatively coupled to a command logic module 130 in the set of command logic modules 130 and communicatively coupled to a control bus 150 of the multicore processor 200.

3. Multicore Processor System

Figure 3:
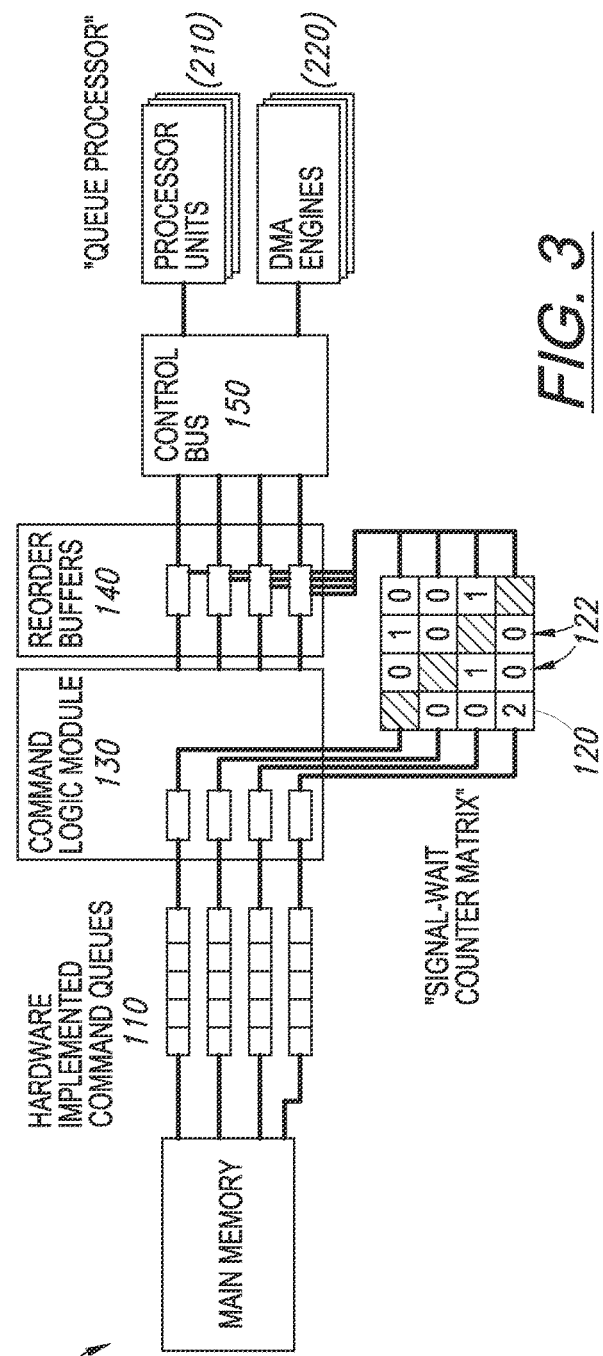
FIG. 3 is a schematic representation of a multicore processor system.

As shown in FIG. 3, a multicore processor system 200 can include: a set of processor units 210; a set of direct memory access engines 220 configured to transfer data between a memory component and the set of processing units 210 including main-memory-to-shared-cache direct memory access engine 222 and a shared-to-individual-cache direct memory access engine 224; a main memory 230; a shared cache 240; a set of individual caches 250; and the queue processor 100.

4. Applications

Generally, the method S100 is executed by a specialized queuing unit (hereinafter "the queue processor 100" of "the system 100") within a multicore processor system 200, which includes a set of heterogeneous resources, in order to maintain dependencies in a parallel process (e.g., a statically scheduled or dynamically scheduled parallel process) such as inference generation for a convolutional neural network. More specifically, the queue processor 100 improves the power efficiency and speed of the multicore processor system 200 by maintaining complex dependencies between commands across scheduled command streams via a specific hardware architecture and a set of wait primitives and signal primitives (e.g., without necessitating a microprogrammed control processor). Thus, the queue processor 100 can leverage a schedule, pre-generated by a scheduler (or dynamically generated by an on-chip control processor) and including signal primitives and wait primitives, to: receive a set of command streams from main memory 230; populate a set of command queues 110 with the set of command streams; and route control signals to resources of the multicore processor system 200 specified by the set of control streams while tracking dependencies between the set of control streams via a signal-wait counter matrix 120 implemented in hardware. Therefore, the queue processor 100 manages dependencies and distributes instructions to the various resources of the multicore processor system 200, thereby preventing the latency and additional power consumption of a microprogrammed control processor from increasing the total latency or total power consumption of the multicore processor system 200 when executing statically scheduled tasks.

The queue processor 100 can interface with components and/or resources of the multicore processor system 200, such as a main memory 230, a control processor, a set of direct memory access controllers or engines (hereinafter "DMA engines 220"), a set of processing units 210—such as general purpose processing units (hereinafter "CPUs"), graphics processing units (hereinafter "GPUs"), and deep learning processing units (hereinafter "DLPs"). Additionally, the queue processor 100 itself includes a set of subcomponents such as a set of command queues 110, command logic module 130 for each command queue 110, a reorder buffer 140 for each command queue 110, a signal-wait counter matrix 120, and a control bus 150 configured to transmit control signals from the queue processor 100 to each of the set of resources of the multicore processor system 200 and from each of the set of resources back to the queue processor 100.

The queue processor 100 cooperates with a scheduler (part of a software compiler), further described in U.S. patent application Ser. No. 17/127,904, which generates a static schedule of a parallel process for execution by the multicore processor system 200 including the queue processor 100 based on a directed acyclic graph (hereinafter "DAG") representing the dependencies between tasks in the process. The scheduler can calculate a number of command streams that can be utilized for execution of the parallel process based on the topography of the DAG, the resources of the multicore processor system 200, and a user's power consumption and performance (e.g., inference time, memory utilization) specifications. While generating the command streams, the scheduler can insert signal and wait primitives to represent dependencies between streams. For example, a wait primitive in a first stream can indicate a dependency upon a signal primitive in another command stream, thereby preventing the queue processor 100 from proceeding to the next command in the command queue 110. Therefore, upon execution of a signal primitive, the queue processor 100 that is decoding and routing the command streams can release corresponding wait primitives in other command queues 110. In one implementation, the scheduler is specifically designed to schedule convolutional artificial neural networks (hereinafter "CNNs") and can generate command streams that when executed at the queue processor 100 evaluate a particular CNN on an input image. Thus, the scheduler and software compiler can convert a DAG representation of a parallel process (e.g., an inference of a CNN based on an input image) to command streams that can be input to the queue processor 100 for decoding and routing to the various resources of a multicore processor system 200, while maintaining dependencies between commands in disparate command streams.

The queue processor 100 includes command queues 110 implemented in hardware in order to enqueue (from main memory 230 or a shared cache 240), store (e.g., within a buffer or shift register), and dequeue individual commands from the command stream for decoding by the command logic module 130 communicatively coupled to the command logic module 130 of the queue processor 100. Depending on the implementation, the queue processor 100 can access command streams from the main memory 230 of the multicore processor system 200 by fetching the command streams from a command stream buffer (e.g., a set of preassigned memory addresses in main memory 230) or, alternatively, the queue processor 100 can access these command streams via batch forwarding by the control processor of the multicore processor system 200. The queue processor 100 can include a set of command queues 110 (e.g., 32 command queues 110) and can utilize any subset of these command queues 110 based on the number of command streams allocated by the scheduler.

After enqueuing command streams into the command queues 110, the queue processor 100 can dequeue commands from each command queue 110 on a first-in-first-out (hereinafter "FIFO") basis. The queue processor 100 then passes the dequeued commands to the command logic module 130 communicatively coupled to each of the command queues 110 in order to decode the dequeued command. The queue processor 100 includes command logic module 130 that further includes a set of logic gates configured to interpret dequeued commands as: instructions, each assigned to a resource of the multicore processor system 200; wait primitives, each indicating a set of command queue 110 identifiers; or signal resources, each indicating a set of command queue 110 identifiers.

Upon detecting an instruction via the command logic module 130 the queue processor 100 can route the instruction to the assigned resource of the multicore processor system 200 via the control bus 150. Additionally, the queue processor 100 can interface with the control bus 150 via a set of reorder buffers 140, where on reorder buffer 140 in the set of reorder buffers 140 is communicatively coupled to each command queue 110, thereby ensuring that instructions issued from each queue are executed by the various resources of the multicore processor system 200 in order.

Upon detecting a wait primitive via the command logic module 130, the queue processor 100 can interface with the signal-wait counter matrix 120 to properly handle the dependencies represented by these wait primitives. For example, the queue processor 100, via the command logic module 130, can: halt dequeuing of subsequent commands from a command queue 110 in response to decoding a wait primitive from this command queue 110 and to detecting zeroes in registers of the signal-wait counter matrix 120 corresponding to those registers indicated by the wait primitive. Upon detecting a signal primitive from another command queue 110, the queue processor 100 can enqueue the signal primitive into a reorder buffer 140 corresponding to the command queue 110 from which the signal primitive was dequeued and, in response to execution of previously enqueued commands in the reorder buffer 140, the queue processor 100 can: increment registers in the signal-wait counter matrix 120 corresponding to registers indicated by the signal primitive; and, in response to detecting that the registers corresponding to the wait primitive are non-zero (e.g., via an interrupt to the command logic module 130 or continuous polling of the signal-wait counter matrix 120 by the command logic module 130), dequeuing a subsequent command from the command queue 110 stalled by the wait primitive and decrementing the registers in the signal-wait counter matrix 120 corresponding to the wait primitive. Thus, the queue processor 100 can maintain dependencies without utilizing a microprogrammed control processor to track individual waits and signals and instead implementing these tracking capabilities directly in hardware.

As described above, the queue processor 100 includes a signal-wait counter matrix 120, which further includes a square matrix of registers (e.g., implemented as binary latches, flip-flops, or a RAM instance), each register corresponds to an "entry" in the matrix. Therefore, each entry of the signal-wait counter matrix 120 represents dependencies of wait primitives dequeued from a waiting command queue 112 on signal primitives dequeued from a signaling command queue 114. A two-dimensional index of the entry in the signal-wait counter matrix 120 represents the waiting command queue 112 with a first dimension of the signal-wait counter matrix 120 and the signaling queue with the second dimension of the signal-wait counter matrix 120. Thus, the value stored by each register in the signal-wait counter matrix 120 represents a number of dequeued signal primitives from a signaling command queue 114 that have not yet released a waiting primitive (hereinafter a "number of pending signal primitives").

In one implementation, the queue processor 100 can evaluate wait primitives that are dependent on signal primitives from multiple queues. Therefore, the queue processor 100, while evaluating a dequeued wait primitive, can access multiple registers in the signal-wait counter matrix 120 and dequeue a subsequent command from the command queue 110 of the wait primitive upon detecting a non-zero number of signals indicated in each of a set of registers in the signal-wait counter matrix 120.

4.1 Example: Deep Vision Processor

In one example application, the queue processor 100 improves execution of CNN on a specialized deep vision processor, further described in U.S. Pat. No. 10,474,464. In this example application, the queue processor 100 receives a static schedule for execution by a set of deep learning processing units configured to efficiently execute convolution, pooling, and fully connected layers common in CNNs on images input to the deep vision processor. The queue processor 100 issues commands and maintains dependencies within each layer of the CNN, thereby halving the processing time required to calculate an inference based on an input image while utilizing lower power when compared to microprogrammed control processor alternatives.

5. Terms

Generally, the queue processor 100 is referred to herein as handling or interpreting a wait primitive and a signal primitive dequeued from "waiting command queue 112" and a "signaling command queue 114" respectively. However, the terms "waiting command queue 112" and "signaling command queue 114" are not intended to indicate a structural distinction and are instead employed for ease of explanation to identify a command queue 110 in the set of command queues 110 from which a wait command or a signal command was respectively dequeued. Thus, a command queue 110 is referred to herein as a waiting command queue 112 to indicate that the queue processor 100 has dequeued a wait primitive from this command queue 110. Likewise, a command queue 110 is referred to herein as a signaling command queue 114 to indicate that the queue processor 100 has dequeued a signal primitive from this command queue 110. Therefore, command queues 110 are labeled as waiting command queues or signaling command queues with reference to a particular dependency between command queues represented by a wait primitive and a signal primitive.

Generally, the queue processor 100 is referred to herein as "accessing" or "reading" registers within the signal-wait counter matrix 120, wherein each register represents "a number of pending signal primitives" between a signaling command queue 114 and a waiting command queue 112 corresponding to the register. The queue processor 100 can execute this "reading" or "accessing" step via a set of read-modify-write ports connecting registers of the signal-wait counter matrix 120 to the set of command logic modules 130. In this step, the queue processor can read or access a set of bits from a relevant register in the signal-wait counter matrix. This set of bits encodes a positive integer (or an equivalent representation) representing a number of pending signal primitives between a signaling command queue 114 for the register and the waiting command queue 112 of the register. For example, if a register includes a bit-represented value of zero the register represents a pending number of signal primitives indicating an absence of pending signal primitives. However, if the register includes a bit-represented value greater than zero than the register represents a pending number of signal primitives indicating at least one pending signal primitive.

6. Multicore Processor System

Generally, as shown in FIG. 2, the queue processor 100 is a component in a multicore processor system 200 which includes other components such as a main memory 230, a control processor, and a set of resources (e.g., DMA engines 220, processing units). Each of these components, insofar as the component relates to the queue processor 100, is described in further detail below. Although the queue processor 100 can improve the performance of any multicore processor system 200, the queue processor 100 can provide increased benefits for multicore processor system 200s that include heterogeneous resources such as a deep learning processor including multiple specialized processing units and/or DMA engines 220.

6.1 Main Memory

Generally, the queue processor 100 interfaces with a main memory 230 or a shared cache 240 (i.e. L2 memory) of the multicore processor system 200 (i.e. primary memory), which stores command streams representing the static process as well as any data required to complete the static process. More specifically, the queue processor 100 interfaces with a command stream buffer defined in main memory 230 of the multicore processor system 200 to access command streams to enqueue in the command queues 110 of the queue processor 100. The queue processor 100 can interface with a main memory 230 implemented as a double data rate synchronous dynamic random-access memory (hereinafter "DDR") in order to achieve state of the art data transfer rates from main memory 230 to the queue processor 100 and to other components of the multicore processor system 200.

In one implementation, the queue processor 100 accesses command streams from a set of predefined locations in the main memory 230 with software defined command stream lengths within these locations. For example, the queue processes can access a predefined set of addresses defining 20 kilobytes of memory within the main memory 230.

The queue processor 100 is communicatively coupled to the main memory 230 via a system interconnect of the multicore processor system 200. In one implementation, the queue processor 100 includes a prefetch engine that periodically fetches sections of each command stream defined in the command stream buffer of the main memory 230 in order to enqueue commands into the command queues 110 of the queue processor 100. In another implementation, the queue processor 100 interfaces with the main memory 230 via the control processor (further described below), which actively pushes command streams from the command stream buffer of the main memory 230 to the command queues 110 of the queue processor 100.

However, the queue processor 100 can be communicatively coupled to and can fetch command streams from any memory accessible by the system interconnect of the multicore processor system 200 including on-chip SRAM memory.

6.2 Control Processor

In one implementation, the queue processor 100 interfaces with a control processor of the multicore processor system 200 configured to fetch command streams from the command stream buffer of the main memory 230 of the multicore processor system 200 and push these command streams to the queue processor 100 via the system interconnect. In this implementation, the queue processor 100 can interface with a hardwired control processor or a microprogrammed control processor to receive instructions from main memory 230. However, in either implementation, the queue processor 100 handles and distributes individual instructions to the resources of the multicore processor system 200.

6.3 Resources

Generally, the queue processor 100 interfaces with a set of resources of the multicore processor system 200 in order to execute the statically scheduled parallel process represented by the set of command streams. More specifically, the queue processor 100 interfaces, via a control bus 150, with a set of resources of the multicore processor system 200 in order to provide control signals to the set of resources enabling these resources to execute the parallel process.

In one implementation, the queue processor 100 interfaces with a set of heterogeneous resources including DMA engines 220, which execute data transfer commands, and processing units 210 of various types, which execute computational tasks. For example, the queue processor 100 can dispatch instructions to CPUs, GPUs, or specialized DLPs that are included in the multicore processor system 200. Each of these heterogeneous resources are described in further detail below.

In another implementation, the queue processor 100 interfaces with a set of heterogeneous resources configured specifically for edge execution of CNNs or other deep artificial neural networks, which are described in further detail in U.S. Pat. No. 10,474,464.

The queue processor 100 interfaces with this set of resources via the control bus 150 and can send and receive control signals from each resource. Thus, the queue processor 100 can: dispatch instructions to each resource; register when each instruction has been executed by the resources; and track the execution order to instructions via the reorder buffer 140 (further described below) that is allocated to each command queue 110 of the queue processor 100.

6.3.1 DMA Engines

Generally, the queue processor 100 interfaces with a set of DMA engines 220 of the multicore processor system 200 configured to transfer blocks of data between memory locations in the processor. More specifically, the queue processor 100 can dispatch specific instructions to DMA engines 220 of the multicore processor system 200 in order to cause the DMA engine 220 to transfer blocks between the main memory 230 of the processor and a shared cache 240 (i.e. L2 memory) of the multicore processor system 200 and between the shared cache 240 and the individual caches 240 of each processing unit of the multicore processor system 200. Additionally, the queue processor 100 can interface with multiple instances of each type of DMA engine 220 (e.g., main memory 230 to shared cache 240, shared cache 240 to individual cache 240) in parallel in order to move multiple sets of data between memory location and/or between different levels of caches concurrently.

6.3.2 Processing Units

The queue processor 100 interfaces with a set of processing units 210 of the multicore processor system 200, such as CPUs, GPUs, and/or specialized DLPs, in order to execute the statically scheduled parallel process. Generally, each processing unit includes its own local cache (e.g., a split L1 cache), set of registers, and arithmetic units for executing instructions dispatched by the queue processor 100. In implementations including heterogeneous processing units 210, the queue processor 100 can access command streams generated by the scheduler, where each command has been allocated to and compiled for the processing unit that can most efficiently execute the instruction. For example, the scheduler can provide matrix multiplication instructions to a GPU rather than a CPU. However, the queue processor 100 can allocate a single queue to manage instructions for multiple processing units 210. Alternatively, the queue processor 100 can receive command streams generated by the scheduler that enable multiple queues to dispatch instructions to a shared set of processing units 210 during various stages of the parallel process executing on the multicore processor system 200. Thus, in one implementation, the queue processor 100 does not restrict particular queues to a particular subset of processing units 210, thereby enabling dynamic mappings of queues to resources in the static schedule for the parallel process. The process of generating command streams for the command queues 110 of the queue processor 100 are further described below and in U.S. patent application Ser. No. 17/127,904.

6.3.3 Queue Processor

As shown in FIG. 3, the queue processor 100 includes a set of subcomponents such as a prefetch engine, a set of command queues 110, command logic module 130 (i.e. implemented as a finite state machine), a set of reorder buffers 140, and a signal-wait counter matrix 120 and is connected to the main memory 230 via the system interconnect and the set of resources via a control bus 150. Each of these subcomponents are described in further detail below.

6.3.4 Prefetch Engine

In one implementation, the queue processor 100 includes a prefetch engine in order to access instructions from a command stream buffer stored in a memory component of the multicore processor system 200. More specifically, the prefetch engine is configured to periodically enqueue each command stream in the set of command streams in a command queue 110 in the set of command queues 110. In particular, the queue processor 100 can fetch batches of commands to enqueue into each command stream, thereby providing a constant stream of commands for handling by the queue processor 100. Therefore, the prefetch engine of the queue processor 100 can include a program counter for incrementing through each command in the command stream and memory address registers for storing the particular memory location of each command stream (corresponding to each command queue 110) within the command stream buffer in the memory component of the multicore processor system 200.

In one implementation, the memory component of the multicore processor system 200 is the main memory 230 of the multicore processor system 200, which defines a set of predefined command stream buffers in a protected memory region of the main memory 230.

6.3.5 Command Queues

Generally, the queue processor 100 includes command queues 110, where each command queue 110 corresponds with a command stream defined in the command stream buffer. More specifically, the queue processor 100 includes a set of command queues 110 communicatively coupled to a memory component 102, such that each command queue 110 in the set of command queues 110 is configured to store a command stream in a set of command streams. In particular, each command queue 110 comprises a queue implemented in hardware comprised of a series of communicatively coupled command containers, each storing a value that encodes a command (i.e. an instruction and resource assignment, a wait primitive, or a signal primitive). For example, the queue processor 100 can include a set of 32 command queues 110, each including a set of 64 command containers, each command container storing 32 bytes of data. Additionally, the queue processor 100 includes command queues 110 that further include a data link, which can include multiple channels, between each command container of the command queue 110. Thus, the queue processor 100 can enqueue, store, and dequeue command streams defined in the command stream buffer by the scheduler.

The queue processor 100 can include command containers implemented as registers, shift registers, or RAM instances to enable accurate storage and fast transfer between command containers. The queue process can include command containers implemented as parallel-in parallel-out shift registers such that the entire command in a container can be transferred to a subsequent command container in the command queue 110 within a single clock cycle.

Additionally, the queue processor 100 can include multiple channels of data links between each command container, such as a data transfer link, a data valid link, and/or a backpressure link. More specifically, the queue processor 100 can include: a data transfer link to link one command container to a subsequent command container in the command queue 110; a data valid link configured to indicate whether any data is present in a prior command container for transfer to a subsequent command container in the command queue 110; and a backpressure link configured to indicate whether a subsequent command container is waiting for a command from a prior command container. Furthermore, the queue processor 100 can include data links implemented as wires, a shared transfer bus, or a point-to-point channel.

6.3.6 Command Logic Modules

Generally, the queue processor 100 includes a set of command logic modules 130, communicatively connected to each of the command queues 110 in the set of command queues 110, in order to decode and handle each command dequeued from each command queue 110. More specifically, the queue processor 100 can include a set of command logic modules 130 communicatively coupled to each command queue 110, each of which includes a set of logic gates defining a finite state machine and configured to handle commands defined in the command queue according to a predefined command set including signal instructions assigned to resources, wait primitives, and signal primitives. Thus, each command logic module is: communicatively coupled to a command queue 110 in the set of command queues 110; communicatively coupled to the signal-wait counter matrix 120; and configured to interpret commands from the command queue 110, the commands including signal primitives, wait primitives; and instructions.

In one implementation, the queue processor 100 can include command logic modules 130 that are each communicatively coupled to a last command container of each command queue 110. Alternatively, the queue processor 100 can include command logic modules 130 that are each communicatively coupled to a specific decode container for storing a command most recently dequeued from each command queue 110. Thus, the queue processor 100 can include a set of command logic modules 130 implemented as a set of finite state machines. Each command logic module 130 takes as input the value of the last command container or the specific decode container in addition to values stored in registers of the signal-wait counter matrix 120 and outputs values to the reorder buffers 140 of the queue processor 100 and to the signal-wait counter matrix 120. Thus, the queue processor 100 includes command logic module 130 that is communicatively coupled to a set of reorder buffers 140 for each command queue 110 of the queue processor 100.

In another implementation, each command logic module 130 in the set of command logic modules, includes a set of logic gates and a set of flip-flops, binary latches, and/or RAM instances defining a finite state machine. In this implementation, the aforementioned memory devices store the state information of the finite state machine represented by the command logic module 130. For example, each command logic module 130 can cycle through a set of states, during which the command logic module 130 accesses the command queue 110 to which it is communicatively coupled, the signal-wait counter matrix 120, and reorder buffer 140 to which it is communicatively coupled in order to: check for pending signal primitives within the signal-wait counter matrix 120; dispatch signal primitives to corresponding registers in the signal-wait counter matrix; and execute other Blocks of the method S100. More specifically, the queue processor 100 can include a set of command logic modules 130 configured to interpret commands from the command queue by: dequeuing a command from the command queue; and decoding the command to identify the command as one of a wait primitive, a signal primitive, and an instruction. In response to identifying the command as a wait primitive, the command logic module 130 can: Identify a signaling command queue 114 in the set of command queues 110 based on the wait primitive; access a register 122 of the signal-wait counter matrix 120 corresponding to the command queue, to which the command logic module 130 is communicatively coupled (e.g., in this case, the waiting command module 112), and the signaling command queue 114 to read a number of pending signal primitives. In response to the number of pending signal primitives representing an absence of pending signal primitives, the command logic module 130 can: halt the command queue 110; and monitor the register 122 in the signal wait counter matrix 120. Alternatively, in response to the number of pending signal primitives representing at least one pending signal primitive, the command logic module 130 can: decrement the number of pending signal primitives in the register 122; and dequeue a subsequent command from the command queue 110. In response to identifying the command as a first signal primitive, the command logic module 130 can: Identify a waiting command queue 112 in the set of command queues 110 based on the signal primitive; Access a register 122 of the signal-wait counter matrix based on the waiting command queue and the command queue 110 to which the command logic module 130 is communicatively coupled (e.g., in this case, the signaling command queue 114); increment the number of pending signal primitives in the register 122; and dequeue the subsequent command from the command queue. In response to identifying the command as an instruction that representing a control signal and is assigned to a resource in the multicore processor system 200, the command logic module 130 can dispatch the control signal to the resource; and dequeue the subsequent command from the command queue. Each of these processes are further described below.

In one implementation, in response to decoding a command via the command logic module 130 and identifying that the command represents an instruction assigned to a resource of the multicore processor system 200, the queue processor 100 can enqueue the instruction to a reorder buffer 140 corresponding to the command queue 110 from which the instruction was dequeued, thereby issuing the instruction to the relevant computational resource in the multicore processor system 200. Upon decoding a command via the command logic module 130 and identifying the command as a wait primitive, the queue processor 100 can, via the command logic module 130, read, and/or decrement a register (or a set of registers) in the signal-wait counter matrix 120 corresponding to the wait primitive. Upon decoding a command via the command logic module 130 and identifying the command as a signal primitive, the queue processor 100 can: enqueue the signal primitive to a reorder buffer 140 corresponding to the command queue 110 from which the signal primitive was dequeued; and in response to the execution of all prior commands in the reorder buffer 140, increment a register (or a set of registers) in the signal-wait counter matrix 120 corresponding to the signal primitive; Thus, the queue processor 100 can maintain dependencies without necessitating microprogramming, by utilizing a hardware implemented command logic module 130 including a finite state machine operating on input commands from command queues 110 and values of the signal-wait counter matrix 120. Implementations of the reorder buffer 140 and the signal-wait counter matrix 120 are further described below.

6.3.7 Reorder Buffers

Generally, the queue processor 100 includes a reorder buffer 140 communicatively coupled to each of the command queues 110 via the command logic module 130 and communicatively coupled to the control bus 150 of the multicore processor system 200, in order to ensure that instructions and signal primitives dispatched from each command queue 110 are executed in order by the set of resources, thereby enabling the queue processor 100 to issue signals to the signal-wait counter matrix 120 only after all previously enqueued instructions are completed by the set of resources. More specifically, the queue processor 100 includes command-queue-specific reorder buffers 140 that can: track the order of tasks dequeued from each queue; enqueue responses from processing resources (via the control bus 150), upon execution of these tasks; and, in response to enqueuing responses for prior tasks in the reorder buffer 140, dequeue subsequent tasks in the reorder-buffer. This implementation varies from a standard reorder buffer 140, which tracks and reorders instructions issued to individual processing units 210. In one implementation, the multicore processor system 200 can also include additional reorder buffers 140 corresponding to each resource.

In one implementation, the queue processor 100 includes a set of reorder buffers 140 including registers arranged in a circular queue and including instruction, destination (e.g., register location in the instruction cache of a resource in the set of resources), a result (of the instruction), and a validity value for the result. Alternatively, the set of reorder buffers 140 can each be implemented as a RAM instance.

Thus, each reorder buffer in the set of reorder buffers is configured to: enqueue instructions and signal primitives dequeued from a command queue associated with the reorder buffer; dequeue instructions and signal primitives in order of execution of the instructions by the multicore processor; and, in response to dequeuing a signal primitive, increment a register in the set of registers based on the signal primitive.

6.3.8 Control Bus

Generally, the queue processor 100, via the set of reorder buffers 140, interfaces with a control bus 150 in order to dispatch commands to the set of resources, thereby providing the set of resources with instructions for execution in a program order dictated by the static schedule of the parallel process.

6.3.9 Signal-Wait Counter Matrix

Generally, the queue processor 100 includes a signal-wait counter matrix 120 communicatively coupled to the command logic module 130 and the set of reorder buffers 140 in order to track dependencies between command queues 110 directly within the hardware of the queue processor 100. More specifically, the queue processor 100 can include a signal-wait counter matrix 120 organized as a square matrix of digital counters (e.g., a cascade of flip-flops or registers), where a first dimension of the signal-wait counter matrix 120 represents a signaling command queue 114 110 in a dependency while a second dimension of the signal-wait counter matrix 120 represents a waiting command queue 112 in a dependency. Therefore, each entry or register (i.e. digital counter) in the signal-wait counter matrix 120 counts the cumulative number of outstanding signals, which correspond to a signaling queue indicated by the first dimension of the entry or register, for yet to be dequeued wait primitives of a second waiting queue indicated by the second dimension of the entry or register.

In one implementation, the queue processor 100 can include a signal-wait counter matrix 120 implemented as a set of RAM instances specifying a matrix of memory addresses where each memory address corresponds to an entry or register of the signal-wait counter matrix 120. More specifically, the signal-wait counter matrix includes a RAM instance defining a set of partitions, each partition in the set of partitions corresponding to a register in the set of registers. In this implementation, the signal-wait counter matrix 120 is communicatively coupled to command logic module 130 for each command queue 110 in the set of command queues 110 via a read-modify-write port and is communicatively coupled to each reorder buffer 140 in the set of reorder buffers 140 via a read-modify-write port. Thus, the queue processor 100 can read and decrement specific entries of the signal-wait counter matrix 120 according to wait primitives in the command logic module 130 and can increment entries of the signal-wait counter matrix 120 according to signal primitives dequeued from the reorder buffer 140.

In another implementation, the queue processor 100 can include a signal-wait counter matrix 120 including a set of flip-flops defining each register or entry in the signal-wait counter matrix. More specifically, the signal-wait counter matrix includes a set of flip-flops defining each register in the set of registers. Thus, in this implementation, the queue processor 100 trades off power efficiency of the signal-wait counter matrix 120 in favor of faster read and write speeds to the signal-wait counter matrix 120.

For example, in an implementation of the queue processor 100 including 32 command queues 110, the queue processor 100 includes a signal-wait counter matrix 120 with 32-by-32 entries with rows corresponding to a signaling command queue 114 110 and columns corresponding to a waiting command queue 112. Thus, a count of one in entry [2, 5] of the signal-wait counter matrix 120 indicates that one signal primitive has been dequeued from command queue 110 2 to command queue 110 5. As a result, when the queue processor 100 dequeues a wait primitive from command queue 110 5 that represents a dependency on a signal from command queue 110 2, the queue process, via the command logic module 130: checks entry [2, 5] of the signal-wait counter matrix 120; identifies that entry [2, 5] is non-zero; decrements entry [2, 5] by one; and dequeues a subsequent command from command queue 110 5. The queue processor 100, by utilizing the signal-wait counter matrix 120, is, therefore, able to track dependencies between queues without generating identifiers for each dependency, thereby reducing hardware overhead or eliminating the need for a microprogrammed dependency tracking solution.

The queue processor 100's handling of signal primitives and wait primitives is described in more detail below.

7. Scheduler

Generally, the queue processor 100 cooperates with a scheduler, executed as a software program on a separate computational device, that functions to generate a static schedule for a parallel process to be executed by the multicore processor system 200 via the queue processor 100. More specifically, the queue processor 100 can cooperate with a scheduler that: takes, as input, a DAG, where each node in the DAG represents an instruction assigned to a resource of the multicore processor system 200 and each edge represents a dependency of one instruction on the result of another. In particular, the queue processor 100 cooperates with a scheduler that allocates each of these instructions to a set of command streams. Thus, the scheduler can generate command streams such that these command streams are executable by the queue processor 100.

In one implementation, the scheduler can allocate instructions to command streams based on the type of resource that can most efficiently execute each instruction and insert instructions into the command stream in an execution order specified by the DAG representing the parallel process. For example, the scheduler can allocate a command stream for all data instructions to a set of main-memory-to-shared-cache DMA engines 220. In another example, the scheduler can allocate a command stream for matrix manipulation operations to a set of GPUs. Thus, by allocating command streams according to resource type of the instructions in the command stream, the scheduler can reduce conflicts between command streams for the same set of resources of the multicore processor system 200.

Additionally or alternatively, the scheduler can allocate command streams across the instructions defined in the DAG representing the parallel process in order to minimize dependencies between command streams, thereby reducing the number of signal primitives and wait primitives present in the command streams and consequently reducing processing time for the parallel process.

Additionally or alternatively, the scheduler can allocate command streams across the instructions defined in the DAG such that each command stream is parallelizable and, as a result, the queue processor 100 can distribute many instructions to multiple resources for execution in parallel.

In one example, the static scheduler can generate a static schedule representing execution of a convolutional neural network. In this example, the static scheduler can convert a series of convolution, pooling, and fully connected layers into a set of command streams for input to the queue processor 100.

The scheduler can also allocate instructions indicated in the DAG representing the parallel process based on the power consumption specification and inference latency (in the case of CNN execution on the multicore processor system 200). For example, the scheduler can increase the number of command streams allocated (up to the total number of command queues 110 included in the queue processor 100) in response to user input indicating a preference for a short inference time. In another example, the scheduler can reduce the number of command streams allocated in response to a lower power consumption specification received from a user.

7.1 Software Compiler

Generally, the scheduler also includes a software compiler, executed on the separate computational device, that converts the static schedule including a set of command streams generated by the scheduler and inserts signal primitives and wait primitives into the command streams in order to represent dependencies between the command streams. More specifically, once the scheduler has allocated each of the instructions to a command stream, the software compiler can identify dependencies between instructions allocated to different command streams and insert a signal primitive into a first command stream subsequent to the instruction from which the dependent instruction depends and a wait primitive into a second command stream of the dependent instruction prior to the dependent instruction. Thus, the software compile, inserts signal primitives and wait primitives based on the static schedule generated by the scheduler.

In one implementation, the multicore processor system 200, via a control unit executing a dynamic scheduling algorithm can dynamically generate the set of command streams for input to the queue processor 100. In this implementation, the control unit of the multicore processor system 200 can organize parallelized instruction into command stream buffers stored on a memory component of the multicore processor system 200. Alternatively, the control unit of the multicore processor system 200 can directly enqueue commands to the set of command queues 110 of the queue processor 100. In another implementation, the queue processor 100 can fetch dynamically generated command streams from the control unit of the multicore processor system 200 via the aforementioned prefetch engine.

8. Operation

Generally, as shown in FIG. 1, the queue processor 100 operates as a component in the multicore processor system 200 during execution of a statically scheduled parallel process. More specifically, the queue processor 100 can: access (i.e. enqueue) command streams from the main memory 230 of the multicore processor system 200; dequeue and decode commands from the command stream on a FIFO basis in Blocks S110, S112, and S114; access registers in the signal-wait counter matrix in Block S120; halt command queues in response to detecting an absence of pending signal primitives indicated by the registers of the signal-wait counter matrix 120 in Block S130; increment, and decrement registers in the signal-wait counter matrix 120 in response to dequeuing signal or wait primitives in Blocks S140 and S150 respectively; and dispatch control signals to the multicore processor system 200 in Block S160. Each of the above Blocks are described in further detail below.

8.1 Enqueuing Command Streams

Generally, the queue process can access (e.g., via the prefetch engine or via a push from the control processor) a set of command streams and enqueues these command streams in the command queues 110 of the queue processor 100. More specifically, for each command stream in a set of command streams in the main memory 230 of the microprocessor, the queue processor 100 enqueues the command stream into a command queue 110 in the set of command queues 110, the command stream including a series of commands, each command in the series of commands comprising one of: an instruction assigned to a resource; a wait primitive pointing to a signaling command queue 114 in the set of command queues 110; and a signal primitive pointing to a waiting command queue 112 in the set of command queues 110. Thus, the queue processor 100 can continuously fill each command queue 110 and dispatch commands from these queues as the multicore processor system 200 executes the parallel process.

In one implementation, the queue processor 100 accesses the main memory 230 to retrieve command streams periodically (e.g., at certain cycle intervals, such as every 100 cycles) during execution of the parallel process. Alternatively, the queue processor 100 can maintain a program counter and access command streams stored in the main memory 230 of the multicore processor system 200 after dequeuing a predetermined number of commands from a command queue 110.

In another implementation, the queue processor 100 can detect that a threshold number of queues in a command queue 110 are empty and access the threshold number of commands from the command streams in the main memory 230. However, the queue processor 100 can access command streams and enqueue commands from these command streams in any other way.

8.2 Decoding Commands

Generally, in Blocks S110, S112, and S114, the queue process can dequeue a command at the end of the command queue 110 on a FIFO basis in order to decode the command. More specifically, the system can: dequeue instructions and the resource assignment of these instructions in order to dispatch these instructions to the correct resource in the multicore processor system 200; or dequeue signal primitives; and dequeue wait primitives.

Upon dequeuing a command from a command queue 110, the queue processor 100 inputs this command to the command logic module 130, which decodes the command. This process is further described below.

8.2.1 Instructions

Generally, the queue processor 100 can decode a command from a command queue 110 to identify the command as an instruction identifying a resource assignment from among the set of resources in the multicore processor system 200. More specifically, the queue processor 100 can decode: a first series of bits of the command to identify an instruction identifier, indicating the particular instruction to be dispatched to a resource; and a second series of bits to identify a resource identifier, indicating the resource to which the instruction is to be dispatched.

8.2.2 Wait Primitives

Generally, in Block S110, the queue processor 100 decodes a wait primitive and identifies the registers that correspond to this wait primitive in the signal-wait counter matrix 120. More specifically, the queue processor 100 can dequeue a wait primitive from a waiting command queue 112 in the set of command queues 110, the wait primitive pointing to a signaling command queue 114 in the set of command queues. In particular, the queue processor 100 can decode a first series of bits indicating that the command is a wait primitive and decode a second series of bits indicating a list of registers (e.g., in the form of a command queue 110 identifiers, such as a binary number between 0 and the total number of command queues 110 minus one) in the signal-wait counter matrix 120 corresponding to the wait primitive. Thus, the queue processor 100, by decoding a wait primitive, can identify the command queues 110 on which the wait primitive depends.

8.2.3 Signal Primitives

Generally, in Block S112, the queue processor 100 decodes a signal primitive and identifies the register or registers 122 corresponding to this signal primitive in the signal-wait counter matrix 120. More specifically, the queue processor 100 can dequeue a first signal primitive from the first signaling command queue, the first signal primitive pointing to the first waiting command queue. In particular, the queue processor 100 can decode a first series of bits indicating that the command is a signal primitive and decode a second series of bits indicating a list of registers (e.g., in the form of command queue 110 identifiers) in the signal-wait counter matrix 120 corresponding to the signal primitive. Thus, the queue processor 100, by decoding a signal primitive, can identify the command queues 110 that depend on the signal primitive from a first command queue 110.

8.3 Command Handling

Generally, the queue processor 100, via the command logic module 130 (implemented as a hardware-based finite state machine) can handle each command dequeued from the set of command queues 110 of the queue processor 100. More specifically, the queue processor 100, via the command logic module 130 in cooperation with the reorder buffer 140, can maintain dependencies by checking, incrementing, and decrementing the signal-wait counter matrix 120. These Blocks of the method are further described below.

Additionally, the queue processor 100 can simultaneously decode, dequeue, and handle commands from multiple queues in parallel such that the queue processor 100 iterates through the instructions of the parallel process in sequence while pausing to satisfy signal primitive and wait primitive dependencies.

8.3.1 Wait Handling

Generally, the queue processor 100 can: dequeue a wait primitive from a waiting command queue 112 in the set of command queues 110 and identify a signaling command queue 114 corresponding to the dependency represented by the wait primitive. More specifically, the queue processor 100 can, in response to the wait primitive pointing to the signaling command queue 114, accessing a register 122 of the signal-wait counter matrix 120, the register 122 storing a number of pending signal primitives for the waiting command queue 112 dequeued from the signaling command queue 114 in Block S120. Upon reading a number of pending signal primitives from the register corresponding to the combination of the waiting command queue 112 and the signaling command queue 114, the command logic module 130 communicatively coupled to the waiting command queue 112 can, in response to the number of pending signal primitives indicating an absence of pending signal primitives, halt the first waiting command queue in Block S130. Alternatively, in response to reading a non-zero number of signal primitives, thereby representing at least one pending signal primitive for the waiting command queue, the command logic modules 130 can: decrement the number of pending signal primitives in the first register in Block S150; and dequeue a subsequent command from the waiting command queue 112 in Block S160. Thus, the queue processor 100 can satisfy dependencies between instructions queue in separate command queues 110 by handling wait primitives via the signal-wait counter matrix.

In one implementation, upon halting the waiting command queue 112 based on an absence of pending signal primitives in the corresponding register 122 of the signal-wait counter matrix 120, the command logic module 130 enters a halted or waiting state. In the halted state, the command logic modules 130 can continuously poll (e.g., once per clock cycle) the corresponding register 122 of the signal-wait counter matrix 120 to reduce delay between an increment in the register 122 and a dispatched signal primitive relevant to the waiting command queue 112. More specifically, the command logic module 130 can, after halting the waiting command queue 112, periodically access the register to read the number of pending signal primitives.

In an alternative implementation, the command logic module 130 can poll the corresponding register 122 in response to receiving an interrupt from the signal-wait counter matrix 120. More specifically, the queue processor 100 can, in response to incrementing the number of pending signal primitives in the register 122 (in response to dequeuing a signal primitive from a signaling queue 114), generate an interrupt for the command logic module 130 of the corresponding waiting command queue 112. The waiting command queue can then, in response to detecting the interrupt the command logic module 130 accessing the register to read the first number of pending signal primitives via an interrupt.

In another implementation, the queue processor 100, via the command logic module 130, reads from the signal-wait counter matrix 120 once per clock cycle (or with some other period) until detecting non-zero values in the register 122 of the signal-wait counter matrix 120 corresponding to the waiting command queue 112 and the signaling command queue 114 identified by the wait primitive. Alternatively, the queue processor 100 can read from the signal-wait counter matrix 120 upon decoding the wait primitive and read the signal-wait counter matrix 120 upon detecting a value change within the signal-wait counter matrix 120.

Generally, in Block S150, upon detecting a non-zero value in the register of the signal-wait counter matrix 120 corresponding to the waiting command queue 112 and the signaling command queue 114 identified by the wait primitive (thereby determining that the dependency represented by the wait primitive is satisfied), the queue processor 100 decrements the register by one and dequeues a subsequent command from the command queue 110. More specifically, the command logic module 130 can decrement the number of pending signal primitives in the register 122.

8.3.2 Signal Handling

Generally, in Block S140, in response to a signal primitive, dequeued from the signaling command queue, pointing to a waiting command queue 112, the command logic module 130 of the signaling command queue can increment a number of pending signal primitives in the register 122 of the signal-wait counter matrix corresponding to the combination of the signaling command queue 114 and the waiting command queue 113. More specifically, the queue processor 100 via a command logic module 130: identifies a signal primitive, enqueues the signal primitive to a reorder buffer 140 corresponding to the command queue 110; and in response to dequeuing the signal primitive from the reorder buffer 140, increments the register 122 in the signal-wait counter matrix 120 corresponding to the signal primitive that represent the signaling command queue 114 and the waiting command queue 112 that depends on the signal primitive. Thus, the queue processor 100 communicates within the command logic module 130, via the signal-wait counter matrix 120, that signals corresponding to particular command queues 110 have been dequeued at other command queues 110 in the queue processor 100.

8.3.3 Instruction Handling

Generally, in Block S160, the queue processor 100 can dispatch an instruction (representing a control signal) to an assigned resource corresponding to the instruction as encoded in a command from the command queue 110. More specifically, in response to dequeuing an instruction from a waiting command queue 112 upon satisfying a wait primitive, the command logic module 130 of the waiting command queue 112, can dispatch a control signal to a resource, the control signal representing the first instruction in Block S160. In particular, the queue processor 100 can generate an entry in a reorder buffer 140 specific to the command queue 110 from which the instruction was dequeued and, based on the status of the reorder buffer 140, dispatch the instruction to the assigned resource. Thus, upon satisfying a wait primitive based on a register 122 in the signal-wait counter matrix 120, the queue processor 100 can dequeue subsequent instructions and issue these instructions via the reorder buffer 140.

8.3.4 Multiple Dependency Handling

In one implementation, the queue processor 100 via a command logic module 130 can interpret wait primitives dequeued from a waiting command queue 112 that represent a dependency on multiple signal primitives dequeued from multiple signaling command queues 114. More specifically, in this implementation, the queue processor 100 can: dequeue a first signal primitive from a first signaling command queue 114 in the set of command queues 110, the first signal primitive pointing to the waiting command queue 112; and, in response to the first signal primitive pointing to the waiting command queue 112, increment a first number of pending signal primitives stored by a first register of the signal-wait counter matrix, the first register corresponding to the first signaling command queue and the first waiting command queue. Then for a second signaling command queue 114, the queue processor 100 can: dequeue a second signal primitive from a second signaling command queue 114 in the set of command queues 110, the second signal primitive pointing to the waiting command queue 112; and, in response to the second signal primitive pointing to the waiting command queue 112, increment a second number of pending signal primitives stored by a second register of the signal-wait counter matrix, the second register corresponding to the second signaling command queue 114 and the waiting command queue 112. Upon dequeuing a wait primitive from the waiting command queue 112 that points to the first signaling command queue 114 and the second signaling command queue 114, the queue processor 110 can: in response to the wait primitive pointing to the first signaling command queue 114, access the first register to read the first number of pending signal primitives; in response to the wait primitive pointing to the second signaling command queue, access the second register to read the second number of pending signal primitives; and, in response to the first number of pending signal primitives representing at least one pending signal primitive and in response to the second number of pending signal primitives representing at least one pending signal primitive, dequeuing the first instruction from the waiting command queue 112. Thus, the queue processor 100 can simultaneously or sequentially check dependency of a wait primitive on two separate signal primitives from two signaling command queues 114. Alternatively, the scheduler can generate multiple consecutive wait primitives within one command stream, each wait primitive depending on a signal primitive from a different signaling command queue in order to achieve a similar functionality with a less compact sequence of commands.

In another implementation, the queue processor 100, via a command logic module 130, can interpret signal primitives that signal to multiple wait primitives. More specifically, the queue processor 100 can dequeue a signal primitive from a signaling command queue 114, the signal primitive pointing to a first waiting command queue 112 and a second waiting command queue 112 in the set of command queues 110. The queue processor 100 can, in response to the signal primitive pointing to the first waiting command queue 112, increment a first number of pending signal primitives stored by a first register of the signal-wait counter matrix 120, the first register corresponding to the signaling command queue 114 and the first waiting command queue 112. Additionally, in response to the signal primitive pointing to the second waiting command queue 112, the queue processor 100 can increment a second number of pending signal primitives stored by a second register of the signal-wait counter matrix, the second register corresponding to the first signaling command queue and the second waiting command queue. Upon incrementing both relevant registers in the signal-wait counter matrix 120, the queue processor can: dequeue a first wait primitive from the first waiting command queue 112, the first wait primitive pointing to the signaling command queue 114; dequeue a second wait primitive from the second waiting command queue 112, the second wait primitive pointing to the first signaling command queue 114. The command logic modules 130 corresponding to each waiting command queue 112 can then: access the first register to read the first number of pending signal primitives; access the second register to read second number of pending signal primitives; in response to the number of pending signal primitives representing at least one signal primitive, decrement the number of pending signal primitives in the register; and dequeue an instruction from the corresponding waiting command queue, the instruction subsequent to the each respective wait primitive. Alternatively, the scheduler cooperating with the queue processor 100 can generate consecutive signal primitives in the signaling command queue 114, each signal primitive signaling a separate waiting command queue 112 in the set of command queues 110. Thus, the queue processor 100 can simultaneously or sequentially check dependency of multiple wait primitives dequeued from separate waiting command queues 112 on a single signal primitive.

9. Command Queue Group Variation

Figure 4:
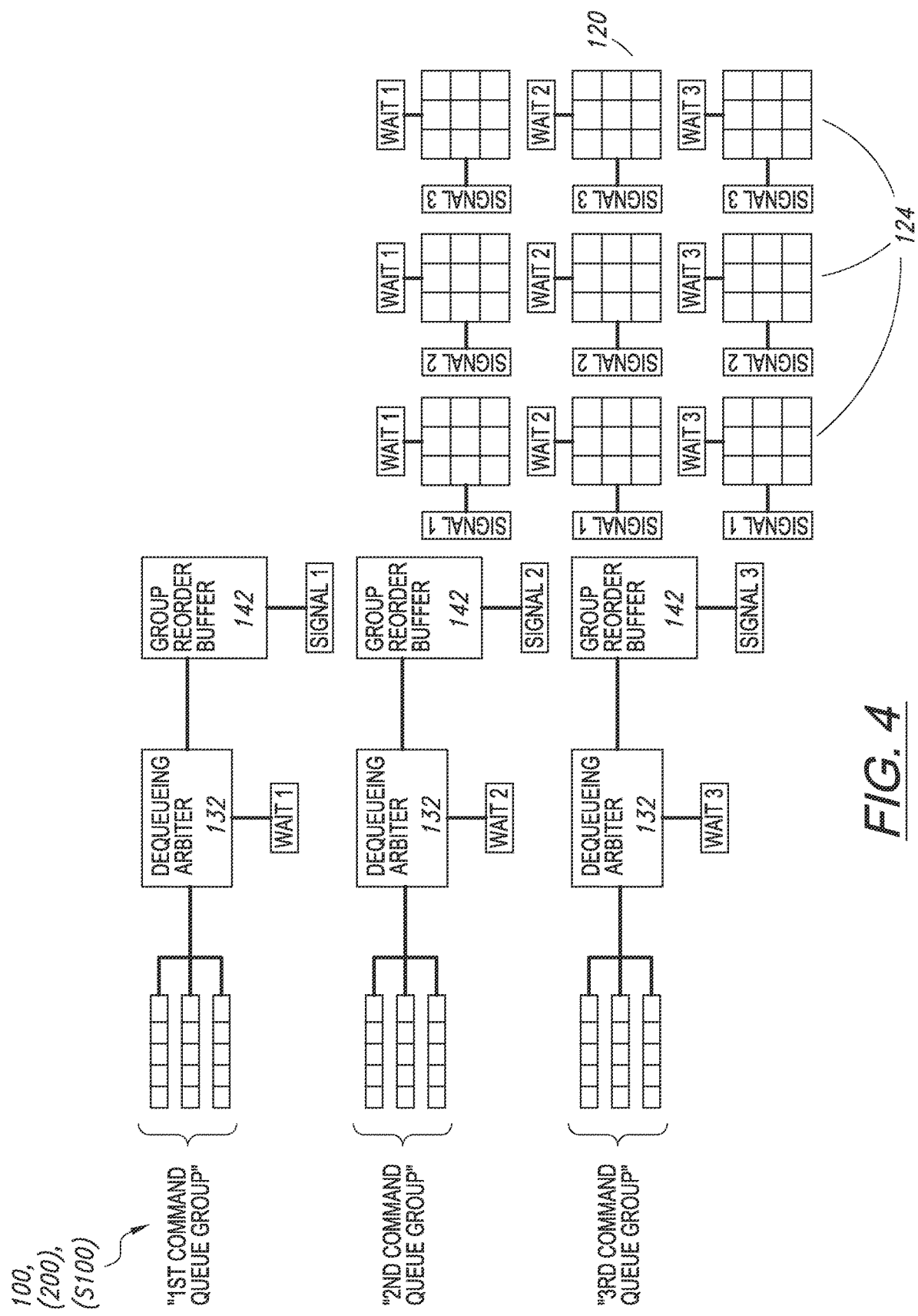
FIG. 4 is a schematic representation of the queue processor.

As shown in FIG. 4, in one variation, the queue processor 100 can include multiple groups of command queues 110, where each group: includes a subset of command queues 110 in the set of command queues 110; shares a single dequeuing arbiter 132; shares a group reorder buffer 140; and accesses a set of signal-wait counter matrix 124 partitions, where each partition includes registers representing dependencies between the command queues 110 corresponding to a pair of command queue 110 groups. More specifically, the queue processor 100 can include: a set of command queue groups in the set of command queues. Additionally, each register in the set of registers of the signal-wait counter matrix 120 can: correspond to a waiting command queue group in the set of command queues groups and a signaling command queue group in the set of command queues groups; and store a number of pending signal primitives for the waiting command queue group dequeued from the signaling command queue group. Likewise, each command logic module in the set of command logic modules can be: communicatively coupled to a command queue group in the set of command queue groups; communicatively coupled to the signal-wait counter matrix; and configured to interpret commands from the command queue group. Thus, by including multiple groups of command queues 110 that share components, the queue processor 100 can reduce the number of read-modify-write ports between the command logic module 130, reorder buffers 140, and the various partitions of the signal-wait counter matrix 120, thereby reducing the on-chip area overhead of the signal-wait counter matrix 120.

For example, in variations of the queue processor 100 that do not include command queue 110 grouping and that includes a signal-wait counter matrix 120 implemented with flip-flops, each command queue 110 and corresponding reorder buffer 140 interfaces with each register of the signal-wait counter matrix 120 with a read-modify-write port resulting in a set of $2^n$ read-modify-write ports, where n represents the number of command queues 110. However, in the command queue 110 grouping variation, the queue processor 100 includes a partitioned signal-wait counter matrix 120, where each partition of the signal-wait counter matrix 120 represents dependencies of the command queues 110 of a first group on the command queues 110 on a second group in the set of groups. Each queue processor 100, therefore, includes a set of $m^2$ signal-wait counter matrix 120 partitions, where m represents the number of command queue 110 groups, where each partition is implemented as a RAM instance, and is addressable via two read-modify-write ports (resulting in $2m^2$ read-modify-write ports). Thus, each signal-wait counter matrix 120 partition receives read and decrement instructions (corresponding to execution of wait primitives dequeue from the set of command queue 110 in the command queue 110 group) via a first read-modify-write port communicatively coupled to the dequeuing arbiter of the command queue 110 group and receives increment instructions (corresponding to execution of signal primitives) via a second read-modify-write port communicatively coupled to the reorder buffer 140 of the command queue 110 group.

In this command queue 110 grouping variation, the dequeuing arbiter dequeues a single command from the command queues 110 in the command queue 110 group per processor cycle and over a series of processor cycles rotates through each of command queues 110 in the command queue 110 groups. The arbiter can then store wait primitives dequeued from a command queue 110 in a memory location specific to the command queue 110 from which the wait primitive was dequeued and can halt dequeuing from this command queue 110 until registers in the signal-wait counter matrix 120 corresponding to the wait-primitive are all non-zero. Thus, in the command queue 110 grouping variation, the dequeue rate of the queue processor 100 is reduced in order to improve space and energy efficiency of the queue processor 100. However, the reduced dequeue rate does not significantly reduce data path performance because the resources of the multicore processor system 200 are generally characterized by a command acceptance and/or execution rate significantly slower than the command dequeue rate. Likewise, in the command queue 110 grouping variation, the signaling rate (for signal primitives) from the reorder buffer 140 associated with each command queue 110 is also reduced. However, the reduced signaling rate also does not significantly reduce data path performance.

In one implementation, of the command queue 110 grouping variation, the queue processor 100 includes three command queue 110 groups: a first command queue 110 group including command queues 110 storing commands corresponding to main-memory-to-shared cache 240 DMAs; a second command queue 110 group including command queues 110 storing commands corresponding to shared-cache-to-individual-cache DMAs; and a third command queue 110 group including command queues 110 storing commands corresponding to processing units 210. Thus, in this implementation, the queue processor 100 includes nine signal-wait counter matrix 120 partitions (shown in FIG. 4) and eighteen read-modify-write ports.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A queue processor for maintaining dependencies between command streams for a multicore processor comprising:
   a first command queue;
   a first register configured to store a first number of pending signal primitives for the first command queue dequeued from a second command queue; and
   a first command logic module:
      communicatively coupled to the first command queue;
      communicatively coupled to the first register; and
      configured to decode a command from the first command queue as one of:
         a signal primitive;
         a wait primitive; and
         an instruction.

2. The queue processor of claim 1:
   further comprising a second register configured to store a second number of pending signal primitives for the second command queue dequeued from the first command queue; and
   wherein the first command logic module is further configured to increment the second number of pending signal primitives stored in the second register in response to decoding the command as a first signal primitive associated with the second command queue.

3. The queue processor of claim 1, wherein the first command logic module is further configured to halt the first command queue in response to:
   decoding the command as a first wait primitive associated with the second command queue; and
   detecting the first number of pending signal primitives representing an absence of pending signal primitives.

4. The queue processor of claim 1, wherein the first command logic module is further configured to decrement the first number of pending signal primitives stored in the first register in response to:
   decoding the command as a first wait primitive associated with the second command queue; and
   detecting the first number of pending signal primitives representing at least one pending signal primitive.

5. The queue processor of claim 1, wherein the first command logic module is further configured to, in response to decoding the command as a first instruction representing a first control signal assigned to a first resource, dispatch the first control signal to the first resource.

6. The queue processor of claim 1, further comprising a first reorder buffer communicatively coupled to the first command logic module, the first reorder buffer configured to:
- enqueue instructions and signal primitives dequeued from the first command queue; and
- dequeue instructions and signal primitives in order of execution.

7. The queue processor of claim 1, further comprising a prefetch engine configured to enqueue a first command stream in the first command queue.

8. The queue processor of claim 1, further comprising:
- a first command queue group comprising the first command queue;
- a second command queue group comprising the second command queue and a third command queue; and
- a second register configured to store a second number of pending signal primitives for the second command queue group dequeued from the first command queue group.

* * * * *